(12) United States Patent
Matsuhashi

(10) Patent No.: US 7,282,876 B2
(45) Date of Patent: Oct. 16, 2007

(54) SYSTEM FOR DRIVING BRUSHLESS DC MOTOR AND METHOD OF DRIVING SAME

(75) Inventor: Syuichi Matsuhashi, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 23 days.

(21) Appl. No.: 11/218,421

(22) Filed: Sep. 6, 2005

(65) Prior Publication Data

US 2006/0066273 A1    Mar. 30, 2006

(30) Foreign Application Priority Data

Sep. 28, 2004   (JP) ............................. 2004-281456

(51) Int. Cl.
*H02R 21/00*   (2006.01)
(52) U.S. Cl. ...................... 318/254; 318/439; 318/138; 388/825
(58) Field of Classification Search ................ 318/254, 318/138, 434; 388/825, 833, 831
See application file for complete search history.

(56) References Cited

U.S. PATENT DOCUMENTS 5,535,481 A * 7/1996 Hartmeier et al. ............ 19/260
2005/0176543 A1* 8/2005 Kirkwood et al. ............. 475/5

FOREIGN PATENT DOCUMENTS

JP    2000-341925 A    12/2000

\* cited by examiner

*Primary Examiner*—Karen Masih
(74) *Attorney, Agent, or Firm*—Birch, Stewart, Kolasch & Birch, LLP

(57) ABSTRACT

A brushless DC motor drive system includes a pole-position detector for detecting respective pole positions of permanent magnets of a rotor of a brushless DC motor. A present speed computing unit computes a present speed of the brushless DC motor on the basis of an output signal from the pole-position detector. A speed differential computing unit computes a speed differential between a speed command and the present speed. An energization start time computing unit computes an energization start time in a present instance on the basis of an energization start time in a preceding instance, and the speed differential. An energization start instruction unit instructs energization start upon the elapse of the energization start time in the present instance from a phase changeover point in time. An energization completion time computing unit computes an energization completion time by subtracting the energization start time in the present instance from preceding pulse time. An energization completion instruction unit instructs energization completion upon the elapse of the energization completion time from the phase changeover point in time.

6 Claims, 3 Drawing Sheets

SYSTEM FOR DRIVING BRUSHLESS DC MOTOR AND METHOD OF DRIVING SAME

BACKGROUND OF THE INVENTION

1. Field of the Invention

The invention relates to a brushless DC motor drive system for driving a fan, blower and so forth, and a method of driving the brushless DC motor.

2. Description of the Related Art

With a brushless DC motor for driving a fan and blower, there has lately been an increase in demand for high power and variable speed, and a variable speed range is required to have a wide scope ranging from high-speed to low-speed.

With the conventional brushless DC motor drive system, for controlling a duty angle, a rotational speed of a brushless DC motor is varied by adjusting a time length from a point in time when an induced voltage is turned from zero up to a point in time when an energization signal is turned ON, and by turning the energization signal OFF when the induced voltage is turned to zero again.

With the brushless DC motor drive system as described, however, the same has drawbacks in that because the energization signal is turned ON in a region where the induced voltage drops, the brushless DC motor is poor in efficiency and further, its vibration is large.

SUMMARY OF THE INVENTION

It is therefore an object of the invention to provide a brushless DC motor drive system capable of driving a brushless DC motor with high efficiency and small vibration, in all speed regions, and a method of driving the brushless DC motor.

According to one aspect of the invention, there is provided a brushless DC motor drive system comprising a pole-position detector for detecting respective pole positions of permanent magnets of a rotor of a brushless DC motor, a present speed computing means for computing present speed of the brushless DC motor on the basis of an output signal from the pole-position detector, a speed differential computing means for computing a difference between a speed command and the present speed, that is, a speed differential, an energization start time computing means for computing energization start time in a present instance on the basis of energization start time in a preceding instance and the speed differential, an energization start instruction means for instructing energization start upon the elapse of the energization start time in the present instance from a phase changeover point in time, an energization completion time computing means for computing energization completion time by subtracting the energization start time in the present instance from preceding pulse time and an energization completion instruction means for instructing energization completion upon the elapse of the energization completion time from the phase changeover point in time.

Further, according to another aspect of the invention, there is provided a method of driving a brushless DC motor, comprising the steps of computing a difference between a speed command and present speed, that is a speed differential, computing energization start time in a present instance on the basis of energization start time in a preceding instance and the speed differential, computing energization completion time by subtracting the energization start time in the present instance from preceding pulse time, starting energization of respective phase stator windings upon the elapse of the energization start time in the present instance from a phase changeover point in time, and completing the energization of the respective phase stator windings upon the elapse of the energization completion time from the phase changeover point in time.

With the brushless DC motor drive system and the method of driving the brushless DC motor, respective energization signals are always turned ON in regions where the absolute value of the induced voltage is large even if a speed command value varies, and a winding current flows to the respective stator windings when the absolute value of the induced voltage becomes large, so that the brushless DC motor can be driven with high efficiency in all speed regions, and vibration of the brushless DC motor becomes smaller.

BRIEF DESCRIPTION OF THE DRAWINGS

Embodiments of the present invention will be described in detail based on the following figures, wherein.

DETAILED DESCRIPTION OF THE INVENTION

Figure 1:
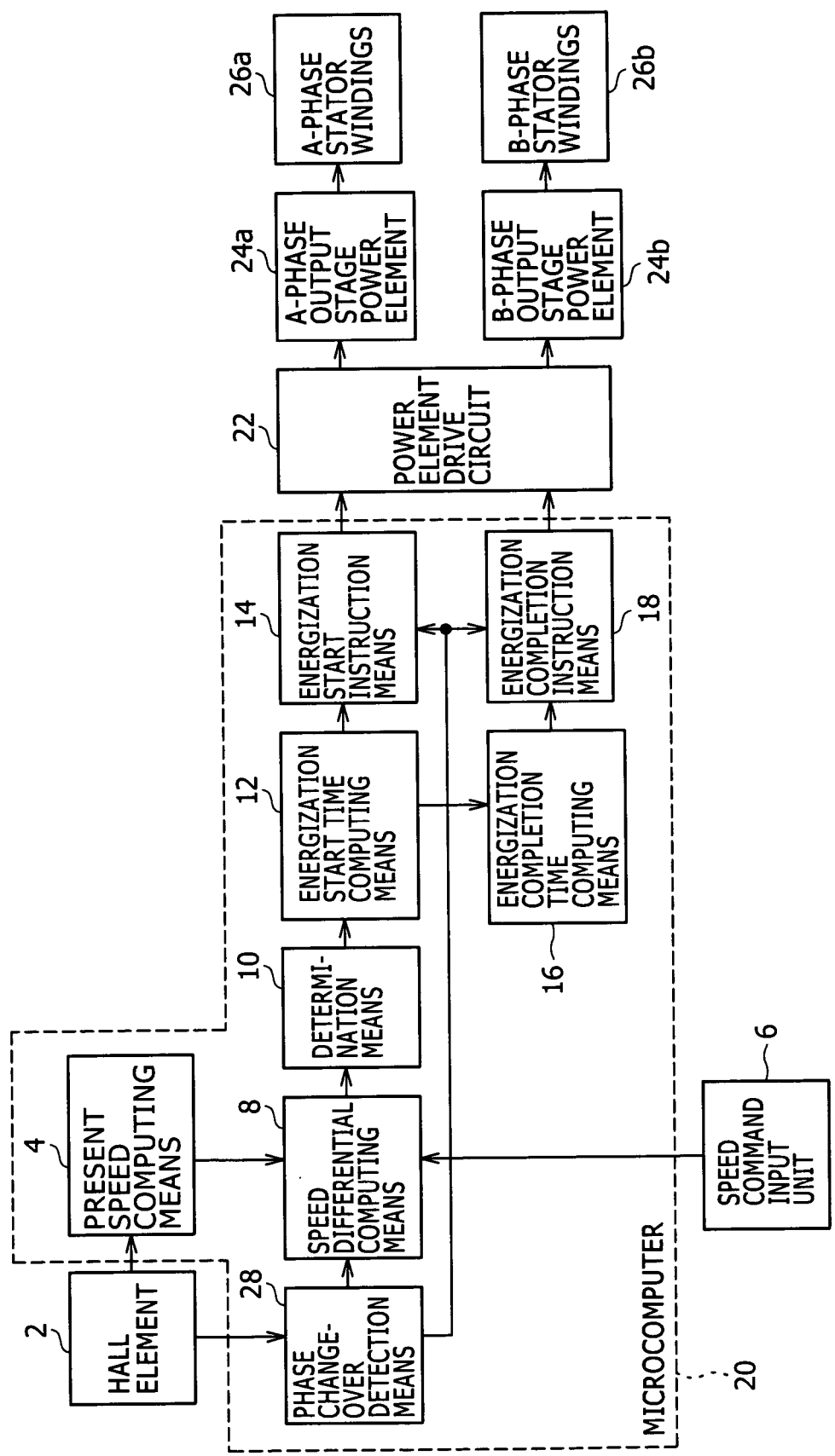
FIG. 1 is a block diagram showing one embodiment of a brushless DC motor drive system according to the invention.

An embodiment of a brushless DC motor drive system according to the invention is described hereinafter with reference to FIG. 1. There are provided a Hall element 2 for detecting respective pole positions of permanent magnets of a rotor of a brushless DC motor, a present speed computing means 4 for computing a present speed of the brushless DC motor on the basis of an output signal from the Hall element 2, a speed command input unit 6 for inputting a speed command, a phase changeover detection means 28 for detecting a phase changeover on the basis of the output signal from the Hall element 2, a speed differential computing means 8 for computing a difference between the speed command and the present speed, that is, a speed differential $\Delta v$ when the phase changeover is detected by the phase changeover detection means 28, a determination means 10 for determining whether the speed differential $\Delta v$ is positive, zero or negative, an energization start time computing means 12 for computing an energization start time T2 in a present instance by subtracting a correction time $\Delta T$ corresponding to the absolute value of the speed differential $\Delta v$ from the energization start time T2 in a preceding instance when the speed differential $\Delta v$ is positive, computing the energization start time T2 in the present instance by adding the correction time $\Delta T$ to the energization start time T2 in the preceding instance when the speed differential $\Delta v$ is negative, and assuming the energization start time T2 in the preceding instance as the energization start time T2 in the present instance when the speed differential $\Delta v$ is zero, an energization start instruction means 14 for outputting an energization start instruction signal for instructing energization start upon the elapse of the energization start time T2 from a point in time when an induced voltage is turned to zero, that is, a phase changeover point in time, an energization completion time computing means 16 for computing an energization completion time T3 by subtracting the energization start time T2 in the present instance from a preceding pulse time T1 of the induced voltage (a time length from the point in time when the induced voltage is turned from zero to that when the induced voltage is turned to zero again) and an energization completion instruction means 18 for outputting an energization completion instruction signal for instructing energization completion upon the elapse of energization completion time T3 from the phase changeover point in time. The present speed computing means 4, the phase changeover detection means 28, the speed differential computing means 8, the determination means 10, the energization start time computing means 12, the energization start instruction means 14, the energization completion time computing means 16 and the energization completion instruction means 18 are included in a microcomputer 20, and the microcomputer 20 sends out the energization start instruction signal and the energization completion instruction signal, respectively. Further, there is provided a power element drive circuit 22 for outputting an A-phase energization signal that is turned ON when the energization start instruction signal is sent out from the microcomputer 20, and that is turned OFF when the energization completion instruction signal is sent out from the microcomputer 20, while outputting an B-phase energization signal that is turned ON when a succeeding energization start instruction signal is sent out from the microcomputer 20, and that is turned OFF when a succeeding energization completion instruction signal is sent out from the microcomputer 20. The power element drive circuit 22 sequentially outputs the A-phase energization signal and the B-phase energization signal. There is provided an A-phase output stage power element 24a for starting energization of A-phase stator windings 26a disposed opposite to the permanent magnets of the rotor with a gap interposed therebetween when the A-phase energization signal from the power element drive circuit 22 is turned ON, and completing the energization of the A-phase stator winding 26a when the A-phase energization signal is turned OFF. Further, there is provided a B-phase output stage power element 24b for starting energization of the B-phase stator windings 26b of the brushless DC motor when the B-phase energization signal from the power element drive circuit 22 is turned ON, and completing the energization of the B-phase stator windings 26b when the B-phase energization signal is turned OFF. And the microcomputer 20 and the power element drive circuit 22 make up an energization control circuit for controlling respective winding currents of the stator windings 26a and 26b on the basis of the output signal from the Hall element 2.

Figure 2:
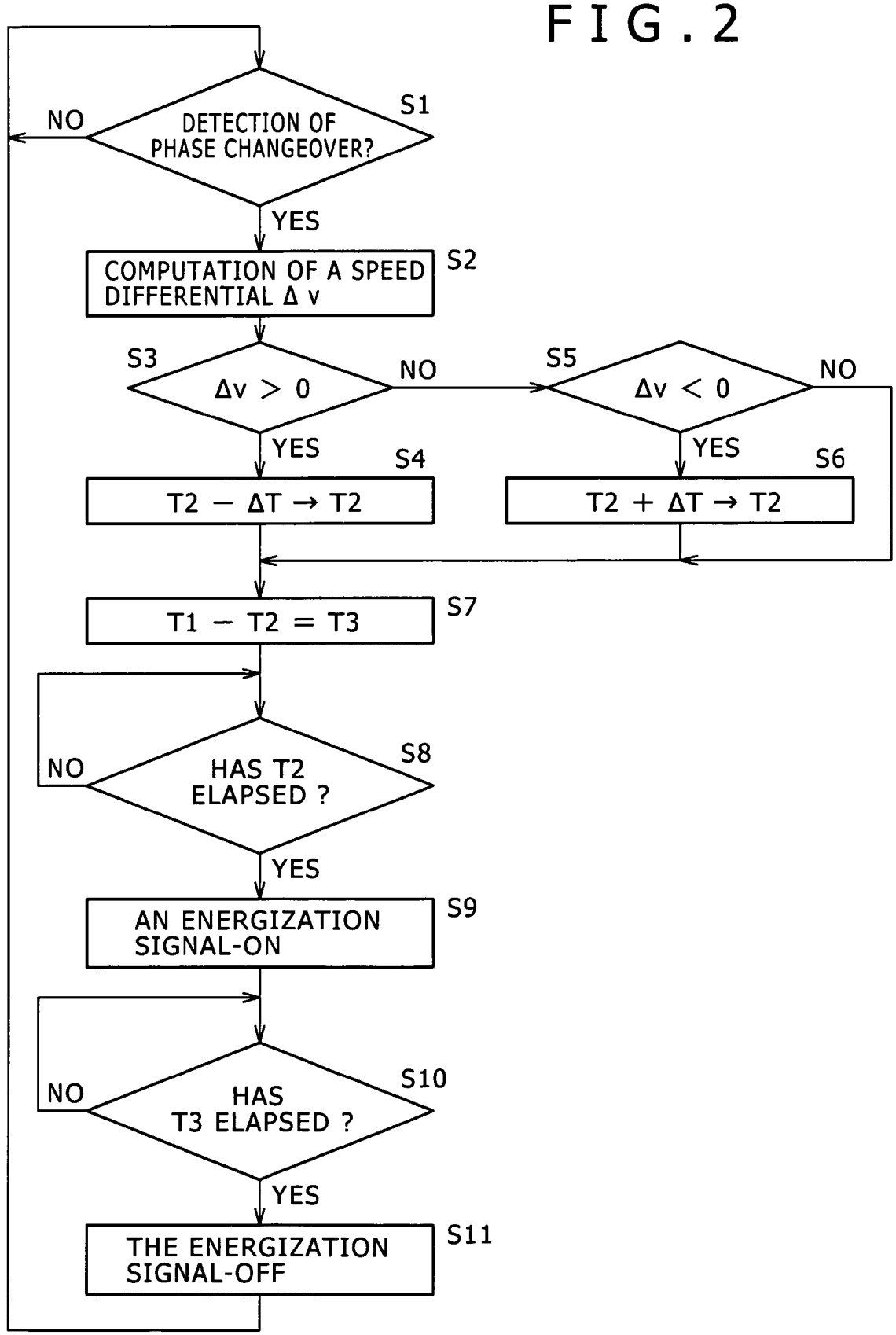
FIG. 2 is a flowchart for illustrating operation of the brushless DC motor drive system shown in FIG. 1.

Now, there will be described hereinafter operation of the brushless DC motor drive system shown in FIG. 1, that is, a method of driving the brushless DC motor, according to the invention, with reference to FIG. 2. First, when the phase changeover detection means 28 detects phase changeover from the B-phase to the A-phase (step S1), the speed differential computing means 8 computes the speed differential $\Delta v$ (step S2). Subsequently, when the determination means 10 determines that the speed differential $\Delta v$ is positive (step S3), the energization start time computing means 12 computes the energization start time T2 in the present instance by subtracting the correction time $\Delta T$ from the energization start time T2 in the preceding instance (step S4). On the other hand, when the determination means 10 determines that the speed differential $\Delta v$ is negative (step S5), the energization start time computing means 12 computes the energization start time T2 in the present instance by adding the correction time $\Delta T$ to the energization start time T2 in the preceding instance (step S6). Further, when the determination means 10 determines that the speed differential $\Delta v$ is neither positive nor negative, in other words, the speed differential $\Delta v$ is zero, the energization start time computing means 12 assumes the energization start time T2 in the preceding instance as the energization start time T2 in the present instance. Next, the energization completion time computing means 16 computes the energization completion time T3 by subtracting the energization start time T2 in the present instance from preceding pulse time T1 (step S7). Next, when the energization start instruction means 14 detects that the energization start time T2 has elapsed from the phase changeover point in time (step S8), the energization start instruction means 14 instructs the energization start, and the microcomputer 20 sends out the energization start instruction signal, whereupon the A-phase energization signal of the power element drive circuit 22 is turned ON (step S9), thereby starting the energization of the A-phase stator windings 26a. Subsequently, when the energization completion instruction means 18 detects that the energization completion time T3 has elapsed from the phase changeover point in time (step S10), the energization completion instruction means 18 instructs the energization completion, and the microcomputer 20 sends out the energization completion instruction signal, whereupon the A-phase energization signal of the power element drive circuit 22 is turned OFF (step S11), thereby completing the energization of the A-phase stator windings 26a. Then, when the phase changeover detection means 28 detects phase changeover from the A-phase to the B-phase (step S1), the speed differential computing means 8 computes the speed differential $\Delta v$ (step S2). Subsequently, the energization start time computing means 12 computes the energization start time T2 in the present instance (steps S3 to S6). Next, the energization completion time computing means 16 computes the energization completion time T3 (step S7). Next, when the energization start instruction means 14 detects that the energization start time T2 has elapsed from the phase changeover point in time (step S8), the microcomputer 20 sends out the energization start instruction signal, whereupon the B-phase energization signal of the power element drive circuit 22 is turned ON (step S9), thereby starting the energization of the B-phase stator windings 26b. Subsequently, when the energization completion instruction means 18 detects that the energization completion time T3 has elapsed from the phase changeover point in time (step S10), the microcomputer 20 sends out the energization completion instruction signal, whereupon the B-phase energization signal of the power element drive circuit 22 is turned OFF (step S11), thereby completing the energization of the B-phase stator windings 26b. Subsequently, when the phase changeover detection means 28 detects phase changeover from the B-phase to the A-phase (step S1), the speed differential computing means 8 computes the speed differential $\Delta v$ (step S2). Thereafter, the energizations of the A-phase stator windings 26a and the B-phase stator windings 26b, respectively, are similarly controlled.

Figure 3:
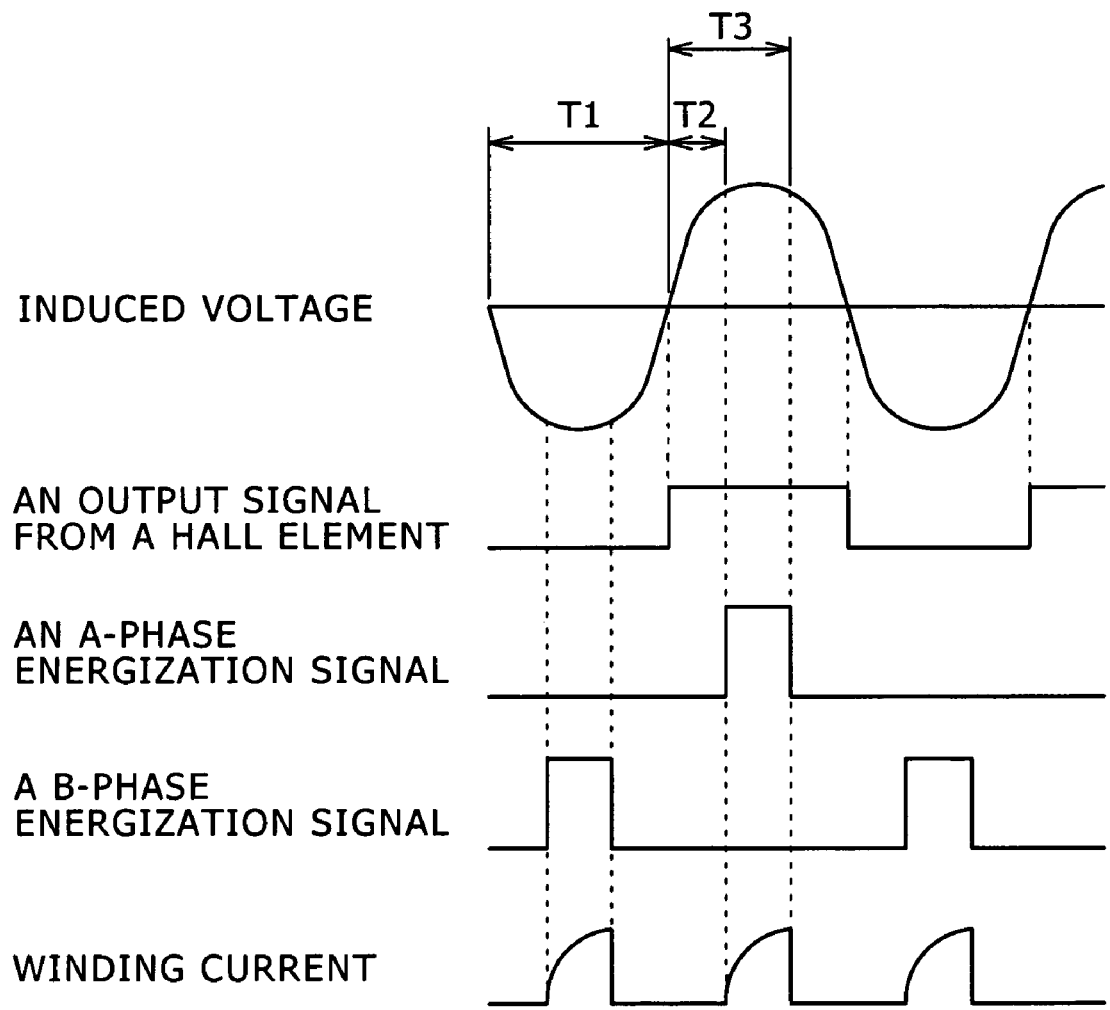
FIG. 3 is a timing chart for illustrating the operation of the brushless DC motor drive system shown in FIG. 1.

With the brushless DC motor drive system according to the invention and a method of driving the brushless DC motor, according to the invention, because a first half of time when the A-phase energization signal and the B-phase energization signal, respectively, are turned OFF is the energization start time T2, and a latter half of time when the A-phase energization signal and the B-phase energization signal, respectively, are turned OFF is also the energization start time T2 (T1−T3=T2) as shown in FIG. 3, the A-phase energization signal and the B-phase energization signal, respectively, are always turned ON in regions where the absolute value of the induced voltage is large even if a speed command value varies, and a winding current flows to the respective stator windings 26a, 26b when the absolute value of the induced voltage becomes large. And a torque of the brushless DC motor is dependent on the product of the induced voltage and the winding current. Accordingly, the brushless DC motor can be driven with high efficiency in all speed regions, vibration of the brushless DC motor becomes smaller, and further, heat generation due to switching losses can be prevented.

Incidentally, with the brushless DC motor drive system described in the foregoing, two lengths of the stator windings 26a and 26b, respectively, are alternately energized with one piece of the Hall element 2, and two pieces of the output stage power element 24a, 24b, so that a drive method for the energization control circuit is called a single-phase unipolar drive method, and although the circuit is the simplest, the stator windings 26a and 26b of the brushless DC motor need be provided with a special winding for unipolar driving, respectively. More specifically, with a 4-pole 4-slot single-phase brushless DC motor, 4 windings are generally divided into 2 sets, and a current is caused to alternately flow thereto. Further, in the case of a 2-pole brushless DC motor, there is adopted bifilar winding whereby two lengths of windings are wound inside one and the same slot. As the two lengths of stator windings are alternately energized, the stator windings are poor in utilization efficiency.

A demand for higher efficiency of the fan as well as the blower has since become severe, and to provide a countermeasure for meeting the demand, there has been an increase in the number of brushless DC motor drive circuits for which a single-phase bipolar drive method is adopted as the drive method of the energization control circuit. With the single-phase bipolar drive method, a bidirectional drive circuit is required to cause a bidirectional current to flow to one stator winding, so that the circuit becomes a little complicated, which is overcome by further integration of the circuit. For the stator winding of the brushless DC motor described, one length of winding is sufficient for one slot, thereby enabling a thicker wire to be used. Consequently, copper loss can be reduced as compared with the case of the unipolar drive method. This can be implemented with a configuration that controls an output stage power element on the high side.

Further, the Hall element 2 has been used as the pole-position detector for detecting the respective pole positions of the permanent magnets of the rotor of the brushless DC motor, however, a constituent member other than the Hall element 2 may be used as the pole-position detector.

The brushless DC motor drive system according the invention is applicable to a drive system for a brushless DC motor for driving a fan and blower The foregoing invention has been described in terms of preferred embodiments. However, those skilled, in the art will recognize that many variations of such embodiments exist. Such variations are intended to be within the scope of the present invention and the appended claims.

What is claimed is:

1. A brushless DC motor drive system comprising:
   a) a pole-position detector for detecting respective pole positions of permanent magnets of a rotor of a brushless DC motor;
   b) a present speed computing means for computing present speed of said brushless DC motor on the basis of an output signal from said pole-position detector;
   c) a speed differential computing means for computing a differential speed between a speed command and said present speed;
   d) an energization start time computing means for computing an energization start time in a present instance on the basis of an energization start time in a preceding instance and said speed differential;
   e) an energization start instruction means for instructing an energization start upon the elapse of said energization start time in the present instance from a phase changeover point in time;
   f) an energization completion time computing means for computing an energization completion time by subtracting said energization start time in the present instance from a preceding pulse time; and
   g) an energization completion instruction means for instructing energization completion upon the elapse of said energization completion time from said phase changeover point in time.

2. The brushless DC motor drive system according to claim 1, wherein said present speed computing means, said speed differential computing means, said energization start time computing means, said energization start instruction means, said energization completion time computing means and said energization completion instruction means are included in a microcomputer.

3. The brushless DC motor drive system according to claim 2, further comprising a power element drive circuit for outputting an energization signal that is turned ON when an energization start instruction signal is sent out from said microcomputer, and that is turned OFF when an energization completion instruction signal is sent out from said microcomputer.

4. The brushless DC motor-drive system according to claim 1, wherein an energization control circuit is based on a unipolar drive method.

5. The brushless DC motor drive system according to claim 1, wherein an energization control circuit is based on a bipolar drive method.

6. A method of driving a brushless DC motor, comprising the steps of:
   computing a speed differential between a speed command and a present speed;
   computing an energization start time in a present instance on the basis of an energization start time in a preceding instance and said speed differential;
   computing an energization completion time by subtracting said energization start time in the present instance from a preceding pulse time;
   starting energization of respective phase stator windings upon the elapse of said energization start time in the present instance from a phase changeover point in time; and
   completing the energization of the respective phase stator windings upon the elapse of said energization completion time from said phase changeover point in time.

* * * * *